(12) United States Patent
Bass et al.

(10) Patent No.: US 6,947,931 B1
(45) Date of Patent: Sep. 20, 2005

(54) LONGEST PREFIX MATCH (LPM) ALGORITHM IMPLEMENTATION FOR A NETWORK PROCESSOR

(75) Inventors: Brian Mitchell Bass, Apex, NC (US); Jean Louis Calvignac, Cary, NC (US); Marco C. Heddes, Raleigh, NC (US); Antonios Maragkos, Raleigh, NC (US); Piyush Chunilal Patel, Cary, NC (US); Michael Steven Siegel, Raleigh, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/544,992

(22) Filed: Apr. 6, 2000

(51) Int. Cl.$^7$ .............................................. G06F 17/00
(52) U.S. Cl. .............................. 707/6; 707/3; 707/102; 707/104.1; 370/392; 370/389; 370/408; 711/216
(58) Field of Search .................. 707/1–10, 100–104.1; 370/352, 389, 408, 428, 432, 392; 711/216

(56) References Cited

U.S. PATENT DOCUMENTS

| | | |
|---|---|---|
| 5,032,987 A | 7/1991 | Broder et al. |
| 5,051,947 A | 9/1991 | Messenger et al. |
| 5,053,991 A | 10/1991 | Burrows |
| 5,438,628 A | 8/1995 | Spitz et al. .................. 382/181 |
| 5,692,173 A | 11/1997 | Chew |
| 5,696,836 A | 12/1997 | Yoshino et al. ............. 382/107 |

(Continued)

FOREIGN PATENT DOCUMENTS

WO    9906926    2/1999

OTHER PUBLICATIONS

"Routing on Longest-Matching Prefixes"—Willibald Doeringer, Gunter Karjoth and Mehdi Nassehi—1996 IEEE (pp. 86-97).*

(Continued)

*Primary Examiner*—Jack Choules
*Assistant Examiner*—Anh Ly
(74) *Attorney, Agent, or Firm*—Joscelyn G. Cockburn

(57) ABSTRACT

Novel data structures, methods and apparatus for finding the longest prefix match search when searching tables with variable length patterns or prefixes. To find the exact match or the best matching prefix, patterns have to be compared a bit at a time until the exact or first match is found. This requires "n" number of comparisons or memory accesses to identify the closest matching pattern. The trees are built in such a way that the matching result is guaranteed to be a best match, whether it is an exact match or a longest prefix match. Using the trail of all the birds and associated prefix lengths enables determination of the correct prefix result from the trail. By construction, the search tree provides the best matching prefix at or after the first compare during walking of the trail or tree.

41 Claims, 14 Drawing Sheets

U.S. PATENT DOCUMENTS

| | | | |
|---|---|---|---|
| 5,737,594 A | | 4/1998 | Williams |
| 5,757,869 A | | 5/1998 | Sands et al. |
| 5,781,249 A | | 7/1998 | Hwang |
| 5,781,772 A | | 7/1998 | Wilkinson, III et al. |
| 5,787,430 A | * | 7/1998 | Doeringer et al. .......... 707/100 |
| 5,946,676 A | * | 8/1999 | Iggulden ......................... 707/3 |
| 5,946,679 A | * | 8/1999 | Ahuja et al. .................... 707/3 |
| 5,956,721 A | * | 9/1999 | Douceur et al. ............... 707/10 |
| 5,995,971 A | * | 11/1999 | Douceur et al. ............ 707/102 |
| 6,047,286 A | * | 4/2000 | Burrows ......................... 707/4 |
| 6,404,752 B1 | * | 6/2002 | Allen et al. ................. 370/335 |
| 6,460,120 B1 | * | 10/2002 | Bass et al. .................. 711/148 |
| 6,526,056 B1 | * | 2/2003 | Rekhter et al. ............. 370/392 |
| 6,553,002 B1 | * | 4/2003 | Bremer et al. .............. 370/351 |
| 6,691,218 B2 | * | 2/2004 | Brown ....................... 711/216 |
| 2002/0184221 A1 | * | 12/2002 | Ahmad et al. ................ 707/10 |
| 2003/0126113 A1 | * | 7/2003 | Brown .......................... 707/1 |

OTHER PUBLICATIONS

"Pattern Matching in Trees"—Christoph M. Hoffmann and Michael J. O'Donnell—Journal of association for Computing Machinery, vol. 29, Jan. 1982, pp 68-95.*

"Scalable High-Speed Prefix Matching"—Marcel Waldvogel, George Varghese, Jon Turner and Bernhard Plattner—ACM transactions on Computer Systems, vol. 19, No. 4, Nov. 2001, pp 440-482.*

"Faster IP Lookups using Controlled prefix Expansion"—V. Srinivasan and george Varghese, 1996 ACM 0-89791-982-3/98/0006, pp 1-10.*

* cited by examiner

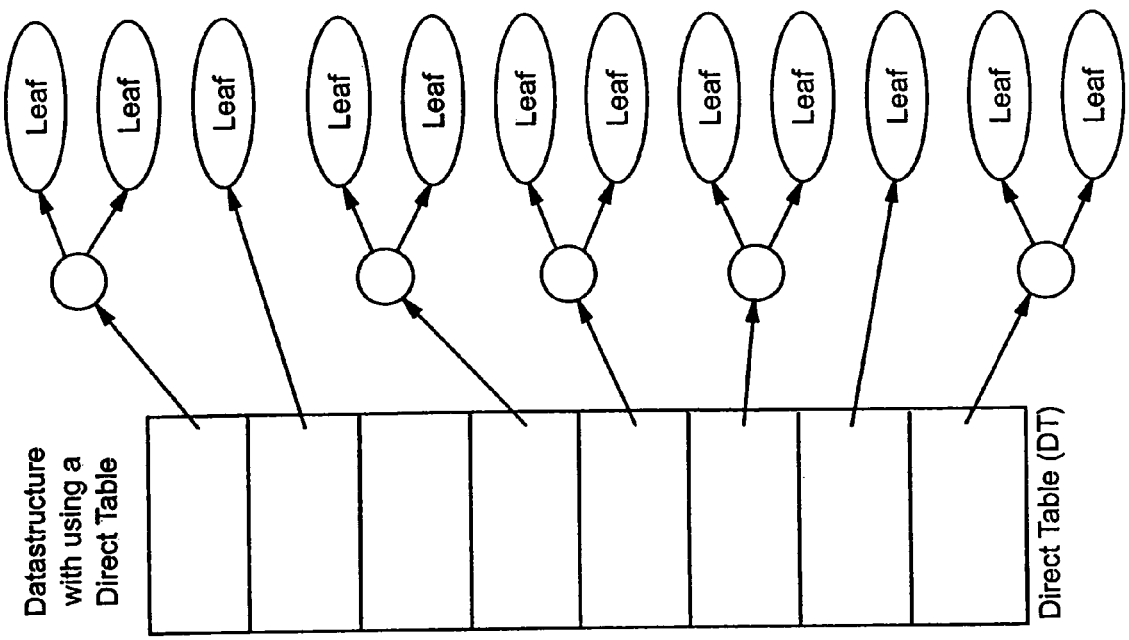
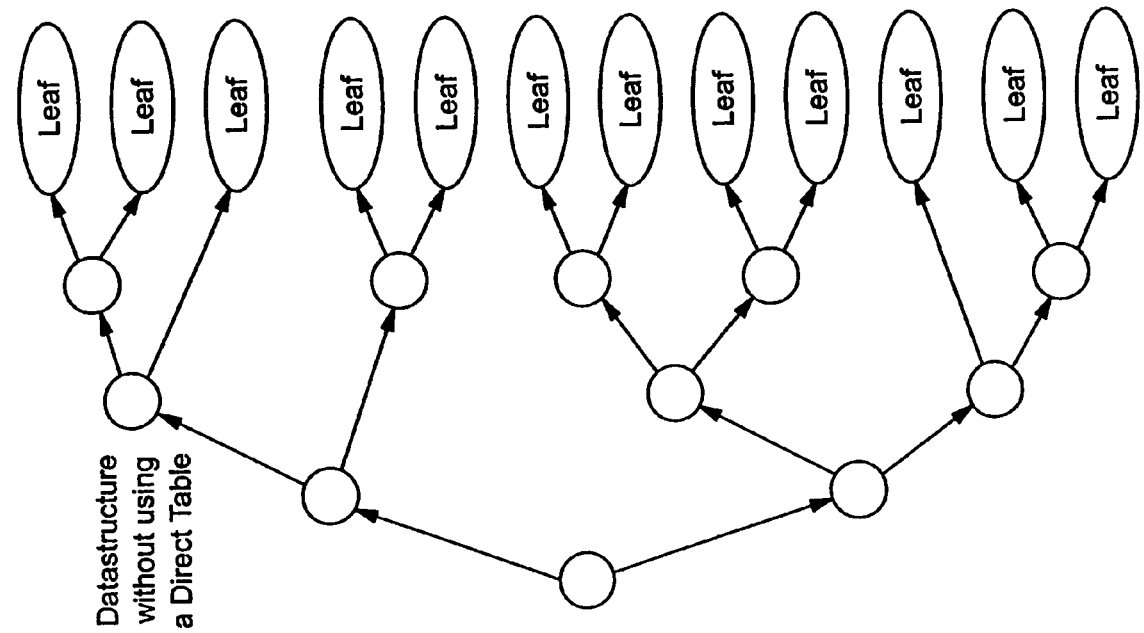
FIG. 6

FIG. 7
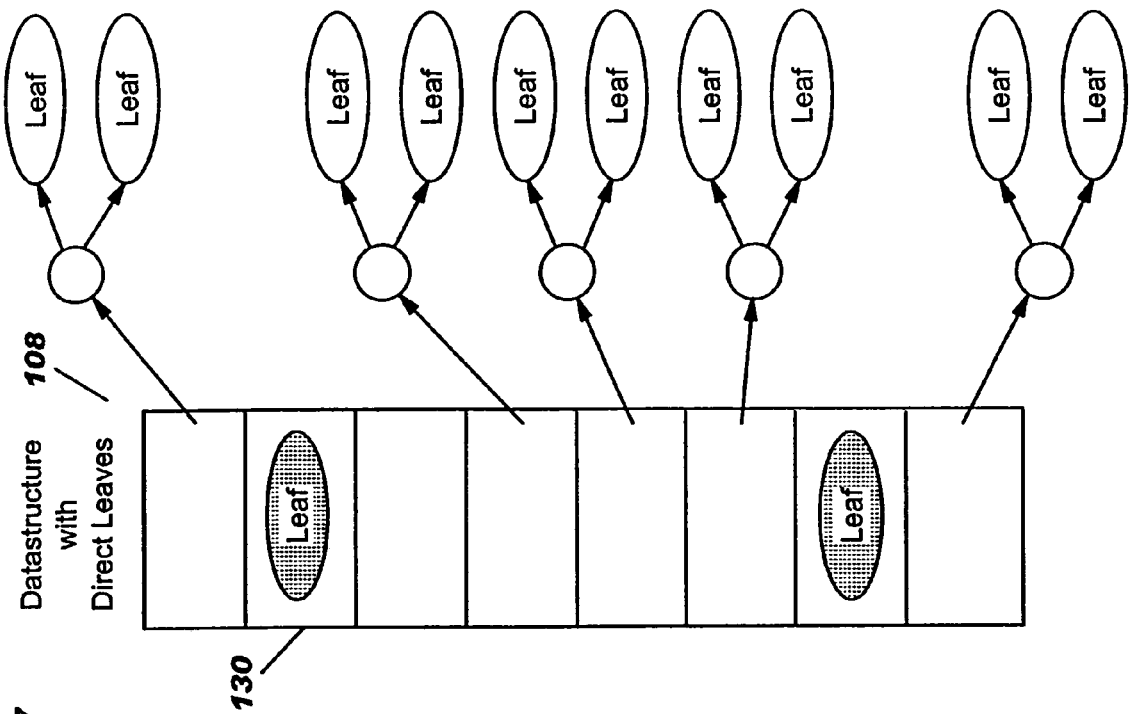
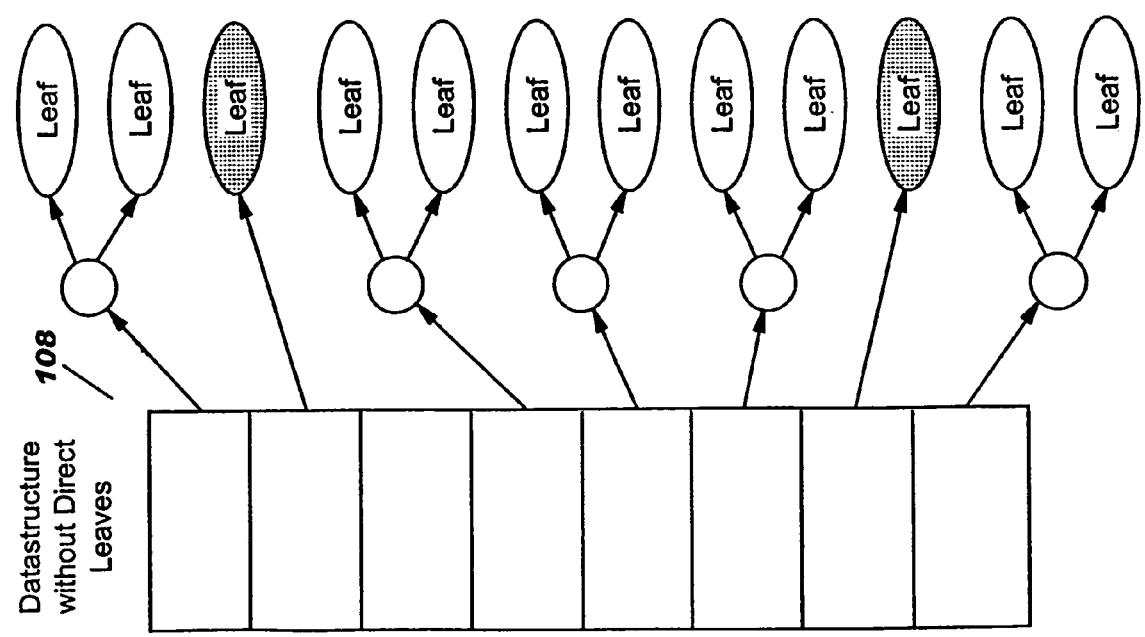

| Format | Conditions | Valid in DTEntry? | Valid in PSCB? | Format (2 bits) | NPA (26 bits) | NBT (8 bits) | LCBA (26 bits) | Spare (2 bits) |
|---|---|---|---|---|---|---|---|---|
| Empty DTEntry | No leaves | Yes | Yes | 00 | 0 | 0 | 0 | 0 |
| LCBA not valid | DTEntry contains pointer to PSCB | Yes | | 00 | NPA | NBT | 0 | 0 |
| LCBA valid; NPA/NBT not valid | Single leaf associated with DTEntry; LCBA contains pointer into leaf; No pointer to next PSCB | Yes | | 01 | 0 | 0 | LCBA | 0 |
| LCBA valid; NPA/NBT valid | Single leaf associated with DTEntry; LCBA contains pointer to leaf; Pointer to next PSCB | Yes | | 01 | NPA | NBT | LCBA | 0 |

FIG. 8

| Input Key | Input Key Length | Pattern stored in the leaf | Leaf-pattern Length | DISP |
|---|---|---|---|---|
| 10011 | 5 | 1011010 | 7 | 2 |
| 10011 | 5 | 1001101 | 7 | 5 |
| 1011010 | 7 | 10011 | 5 | 2 |

FIG. 12

LUDefTable Tree Definition

| Field | Size | Bits |
|---|---|---|
| CacheEntry | 1 | 0 |
| Tree_Type | 2 | 2..1 |
| hash-type | 4 | 6..3 |
| color_en | 1 | 7 |
| P1P2_max_size | 5 | 12..8 |
| NPARope_en | 1 | 13 |
| NPASMT_en | 1 | 14 |
| CompIndex_en | 1 | 15 |
| PSCB_fq_index | 6 | 21..16 |
| PSCB_Height | 1 | 22 |
| Mask_Vector_En | 1 | 23 |
| CompIndex | 8 | 31..24 |
| DT_base_addr | 26 | 57..32 |
| DT_size | 4 | 61..58 |
| DT_interleaf | 2 | 63..62 |
| Leaf_fq_index | 6 | 69..64 |
| Leaf_Width | 2 | 71..70 |
| Leaf_Height | 3 | 74..72 |
| DirectLeafEn | 1 | 75 |

FIG. 13

| Field | Size | Address in TSM where PSCB is located |
|---|---|---|
| NPA0 | 26 | Next PSCB address: pointer to next PSCB in the tree for 0-part of PSCB |
| NBT0 | 8 | Next bit to test for 0-part of PSCB |
| LCBA0 | 26 | Leaf control block address: pointer to leaf for 0-part of PSCB |
| NPA1 | 26 | Next PSCB address: pointer to next PSCB in the tree for 1-part of PSCB |
| NBT1 | 8 | Next bit to test for 1-part of PSCB |
| LCBA1 | 26 | Leaf control block addess: pointer to leaf for 1-part of PSCB |
| Index | 8 | Index of this PSCB (physically stored in the previous PSCB) |
| PatBit | 1 | The value of HashedKey[Index], based on the value of the Index field in the PSCB register |

FIG. 14

| Field Name | Length | Description |
|---|---|---|
| NLARope | 4 bytes | Leaf chaining pointer, aging information and direct leaf information |
| Prefix_Len | 1 byte | This field is not used by the TSE for FM trees and can be used by picocode |
| pattern | 2 - 18 bytes | Pattern to be compared with the HashedKey |
| UserData | variable | The contents of this field is under complete picocode control; the UserData field can include one or more counters |

LONGEST PREFIX MATCH (LPM) ALGORITHM IMPLEMENTATION FOR A NETWORK PROCESSOR

CROSS-REFERENCE TO RELATED APPLICATIONS

This application is related to, and contains common disclosure with, co-pending and commonly assigned patent applications "Network Processor Processing Complex and Methods", Ser. No. 09/384,691, filed Aug. 27, 1999; "Full Match (FM) Search Algorithm Implementation for a Network Processor", Ser. No. 09/543,531, filed Apr. 6, 2000; and "Software Management Tree Implementation for a Network Processor", Ser. No. 09/545,1000, filed Apr. 6, 2000. Each co-pending patent application is hereby incorporated by reference into this description as fully as if here represented in full.

BACKGROUND OF THE INVENTION

The present invention relates generally to pattern matching algorithms, more particularly, to a longest prefix matching search algorithm that can be implemented in a network processing device.

The demand for hardware-integrated processing to support more and more complex tasks at media speed has led to the creation of network processors. Network processors provide wirespeed frame processing and forwarding capability with function flexibility through a set of embedded, programmable protocol processors and complementary system coprocessors. Network processors are expected to become the fundamental network building block for network devices in the manner that microprocessors are for today's personal computers. Network processors offer real-time processing of multiple data streams, providing enhanced security and IP packet handling and forwarding capabilities. In addition, they provide speed improvements through advanced architectures, such as parallel distributed processing and pipeline processing designs. These capabilities can enable efficient search engines, increased data handling throughput, and provide rapid execution of complex tasks. The programmable features of network processors provide network product developers an easier migration path to implement new protocols and technologies without requiring new custom Application Specific Integrated Circuit (ASIC) designs.

Network processors provide a highly customizable, scalable technology for the development of interconnect solutions for Internet or enterprise network providers. A network processor provides the basis for a wide range of solutions from a low-end, stand-alone device to a large multirack solution. Scaling of this nature is accomplished through the use of high performance, non-blocking packet routing switch technology and proprietary interfaces such as IBM Corporation's Data Aligned Serial Link (DASL) interface which can be adapted to other industry switch technologies.

As a programmable communications integrated circuit, the network processor provides very efficient packet classification, multi-table lookups per frame, packet modification, queue/policy management, and other packet processing capabilities. The network processor integrates a switching engine, search engine, frame processors and Ethernet MACs on one device to support the needs of customers who require high capacity, media weight switching frames based on frame content at any protocol layer.

Hardware accelerators perform frame forwarding, frame filtering and frame alteration. The network processor's ability to enforce hundreds of rules with complex range and action specifications sets a new benchmark for filtering capabilities, making a network processor-based system uniquely suited for high capacity server farm applications.

A typical system developed with a network processor uses a distributed software model, with each programmable network processor executing tasks concurrently. Some functions are performed in the control point (CP) processor, which can be internal or external to the network processor. The CP processor provides support for layer 2 and layer 3 routing protocols, and layer 4 and layer 5 network applications and systems management. Wirespeed forwarding and filtering functions are performed by a combination of the network processor hardware and resident picocode.

In communication networks, comprising a number of interconnected nodes, data can be sent from one node to any other node or network. Specialized nodes called routers are responsible for forwarding the data to their destinations.

Any data sent through a communication network contains information about the destination address, generally as part of a header. Each router compares this information, or at least part of it, with a list of addresses stored internally. If a match is found between stored addresses and the destination address, the router establishes a path leading to the destination node. Depending on the network size and structure, the data are either directly forwarded to their destination or sent to another intermediate router. The International Organization for Standardization (ISO) promulgated a routing standard in which a router stores routing information for partial addresses. The router then sends the packet to the best matching partial address it has in its database. The ISO standard allows a hierarchal structure of nodes to be built using a given number of digits or a given header length. Main routers are addressed by the initial part of the address, subrouters by the middle part, and the final destination by the last digits of the address. Therefore, it is sufficient for any router to read the digits assigned to the level of the hierarchy to which the data are to be sent.

The routing of the receive packet is based on the accompanying address string. The address string is used as a search key in a database which contains the address string along with other pertinent details such as which router is next in a delivery of a packet. The database is referred to as a routing table, while the link between the current router and the next router is called the next hop in the progress of the packet. The routing table search process depends on the structure of the address as well as the organization of the tables. For example, a search key of a size less than 8 bits and having a nonhierarchal structure would most efficiently be found in a routing table organized as a series of address entries. The search key would be used as an index in the table to locate the right entry. For a search key of a larger size, say thirty-two bits, the corresponding routing table may have more than 10,000 entries. Organizing the database as a simple table to be searched directly by an index would waste a large amount of memory space, because most of the table would be empty.

Conventional routers break up the search process into several steps. The first step is to determine whether the router is directly connected to the destination host computer. In this case, the message is one hop from the destination and should be routed in that direction. If the destination computer is not directly connected to the router, the next step is to determine the topological direction of the destination network. If the direction is determined from the topological layout, the message is routed that way. Otherwise, the final step is to route the message along a default link.

Typically, the first step is performed using a linear search through a table containing the thirty-two bit addresses of host computers directly connected to the router. Reflecting the local topology, each entry in the address table is connected to a corresponding output interface leading directly to the addressed computer. When a destination address is received by a router, the full thirty-two bits are compared with each of the destination addresses in a table. If a match is found, the message is sent directly to the corresponding destination via the specified router interface.

The second step, that of determining the direction of the destination network, is not usually performed by a linear search through a table since the number of network addresses would make such a table difficult to manage and use. In the prior art, when address strings conformed to the three-level hierarchy of network address, subnet address and host identification, routers performed the determination using one of several well-known techniques, such as hashing, Patricia-tree searching, and multilevel searching. In hashing, a hash function reduces the network portion of the address, producing a small, manageable index. The hash index is used to index a hash table and to search for a matching hash entry. Corresponding to each hash entry of the hash table is the address of an output interface pointing in the topological direction of a corresponding network. If a match is found between the hash network portion and a hash entry, the message is directed towards the corresponding interface and destination network.

Hashing reduces a large, unmanageable field to a small manageable index. In the process, however, there is a chance that two or more fields may generate the same hash index. This occurrence is referred to as a collision, since these fields must be stored in the same location in the hash table. Further searching is needed to differentiate the entries during a collision. Therefore, collisions reduce the efficiency obtained from using the hashing search, and in the worst case, where all permissible addresses reduce to a single index, hashing is rendered practically useless as a search process.

Patricia-tree searching avoids the collisions encountered by hashing methods. This method of searching requires that all address strings and accompanying information, such as related route information, be stored in a binary tree. Starting from the most significant bit position within the address string, the search process compares the address, bit by bit, with the tree nodes. A matched bit value guides the search to visit either the left or the right child node and the process is repeated for the next bit of the address. The search time is proportional to the size of the longest address string stored. In Patricia-tree searching, the difference between the average search time and the worst case search time is not very large. In addition, the routing table is organized quite efficiently. It requires less memory than comparable routing tables of hashing methods. Patricia-tree searching handles the worst case searches better than the hashing methods, but in most cases it takes significantly longer to locate a match. Therefore, many conventional routers use a combination of hashing and Patricia-tree searching. This combination is called multilevel searching.

Multilevel searching joins hashing with Patricia-tree searching. A cache stores a hash table containing a subset of the most recently, and presumably most commonly, routed network addresses, while a Patricia-tree stores the full set of network addresses. As the message is received, the destination address is hashed onto the table. If it is not located within a pre-determined period of time, the address is passed to the Patricia-tree search engine which insures that the address, if stored, will be found.

In the prior art, there are a number of known tree search algorithms including fixed match trees, longest prefix match trees and software managed trees. Fixed match trees are used for fixed size patterns requiring an exact match, such as layer 2 Ethernet MAC tables. Longest prefix match trees are used for variable length patterns requiring only partial matches, such as IP subnet forwarding. Software managed trees are used for patterns that are defined as ranges or bit masks, such as filter rules. In general, lookup is performed with the aid of a tree search engine (TSE).

SUMMARY OF THE INVENTION

It is an object of the invention to provide a longest prefix match algorithm that does not require storage on the previous pointer and uses only a forward pointer along with next bit or group of bits to test thus reducing storage space for nodes.

This invention describes a novel data structure for longest prefix match search, which provides the mechanism for searching tables efficiently with variable length patterns or prefixes. This approach allows a very efficient and simple implementation with the least amount of storage and search time. In modern communications networks, it is very important to identify the best match prefix very quickly due to the speed and volume of traffic. An example is the IP layer 3 forwarding table. Typically, when a forwarding engine is looking for a given IP address/key, the matching result could be full match/exact match for a host address or it could be a prefix for a network address. This requires both exact full match search followed by all prefix matches to determine the most appropriate match result. Typically, to find the exact match or the best matching prefix, one has to compare a bit at a time until finding the exact or first match. To achieve this, one has to compare bitwise, requiring "n" number of comparisons or memory accesses to identify the closest matching pattern. The described approach addresses both exact as well as longest prefix match with the least number of comparisons. The trees are built in such a way that the matched result is guaranteed to be a best match, which could be an exact or a longest prefix match.

Using the trail of all the birds and its prefix length allows going to the correct prefix result from the trail. Since the full pattern and its prefix length are stored in the leaf, this allows the backtracking of the trail for tree management functions. By construction, the tree provides the best matching prefix at or after the first compare during walking the trail or tree. This concept is scalable to support various combination of values for address, next bit to test (NBT), leaf sizes and other components used.

BRIEF DESCRIPTION OF THE DRAWINGS

The invention is better understood by reading the following detailed description of the preferred embodiment in conjunction with the accompanying drawings, wherein:

FIG. 6 illustrates the effect on exemplary data structures of using a direct table in accordance with a preferred embodiment of the invention.

FIG. 7 illustrates the effect on exemplary data structures of having direct leaves enabled in accordance with a preferred embodiment of the present invention.

FIG. 8 illustrates an exemplary structure of a DT entry and pattern search control block (PSCB) line formats in a Longest Prefix Match search tree in accordance with a preferred embodiment of the present invention.

FIG. 12 illustrates the internal structure of an exemplary lookup definition table in accordance with a preferred embodiment of the present invention.

FIG. 13 illustrates the internal format of a PSCB register.

FIG. 14 illustrates the fixed leaf format for LPM trees.

DETAILED DESCRIPTION OF THE PREFERRED EMBODIMENT

Figure 1:
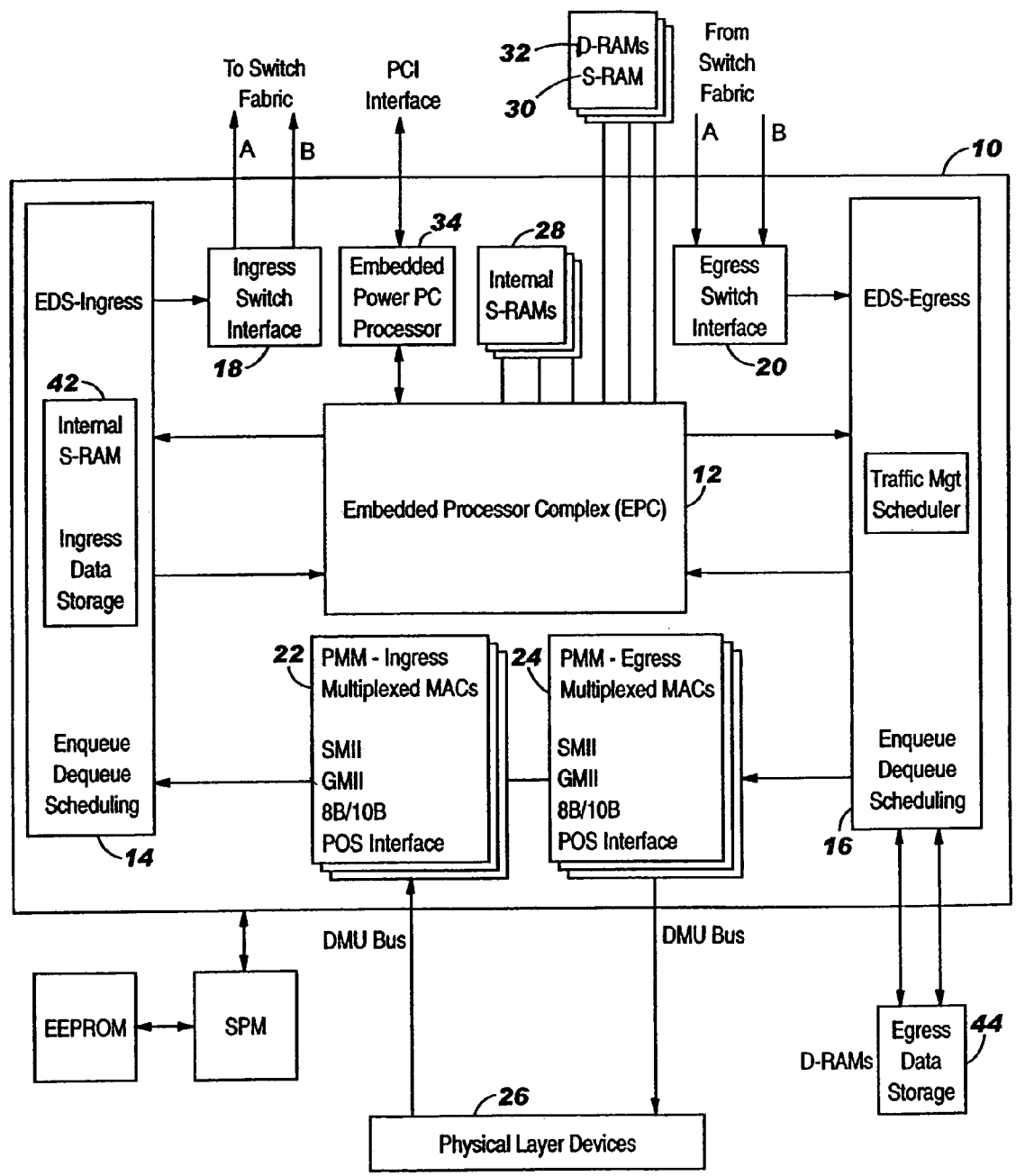
FIG. 1 illustrates an exemplary architecture for a network processor in accordance with a preferred embodiment of the present invention.

The present invention will be described in the context of a network processor in which the invention is embedded. The network processor 10 is a programmable switching and routing system on a single chip, an architecture of which is depicted in FIG. 1. It provides media interfaces for 10/100 Ethernet, Gigabit Ethernet and Packet Over SONET (POS) as well as data aligned serial links (DASL) for attachment to switch interfaces. Internal hardware accelerators increase performance and efficiency. An embedded processor complex (EPC) 12 includes protocol processors and an internal control point processor for frame processing, configuration and management support.

Up to N parallel protocol processors are available. In an embodiment of 16 protocol processors, 16,384 words of internal picocode instructions store and 32,768 words of external picocode instructions store are available to provide 2,128 million instructions per second (MIPS) of aggregate processing capability. In addition, each protocol processor has access to M hardware accelerator coprocessors which provide high speed pattern search, data manipulation, internal chip management functions, frame parsing, and data prefetching support. In a preferred embodiment control storage for the protocol processors is provided by both internal and external memories: 32K of internal static random access memory (SRAM) 28 for immediate access, external zero bus turnaround (ZBT) SRAM 30 for fast access, and external double data rate (DDR) dynamic random access memory (DRAM)$_{32}$ for large storage requirements.

Using embedded hardware accelerators in conjunction with preprocessing algorithms, operating on the attached control point processor 34, the network processor 10 is capable of processing frames through one hundred or more filter rules with complex range, priority, and action specifications at wirespeed. This makes a network processor-based system well suited for gateways, server farm applications, and filtering tasks associated with processing a mix of traffic.

Control point software provides automatic logic checking when a network administrator enters filter rules to a coherent, user-friendly interface. Using novel flow control based upon stability theory, the network processor 10 withstands higher rates of temporary over subscription without Transmission Control Protocol (TCP) collapse than commonly-used random early discard methods. The network processor 10 also delivers differentiated services by automatically allocating bandwidth, relieving network administrators from having to predict the effects of setting dozens of thresholds on the basis of momentary or assumed traffic statistics.

A single network processor 10 provides media speed switching for up to 40 Fast Ethernet or four Gigabit Ethernet ports. It can also be configured to support OC-48c, OC-48, four OC-12 or sixteen OC-3 ports. For scalibility, the two 3.5 Gbps serial DASL links can be used to interconnect two network processors to double the port density, or to attach switch fabrics to create switching solutions with up to 64 network processors. The two DASL links, one primary and one secondary, can also provide connection to a redundant switch fabric for increased system availability.

One exemplary embodiment of a network processor 10 includes the following major sections as illustrated in FIG. 1:

1. An embedded processor complex (EPC) 12 including up to 16 programmable processors plus coprocessors;
2. An enqueue-dequeue-scheduling logic 14 for frames traveling from the Ethernet physical layer devices to the switch fabric (EDS-Ingress);
3. An enqueue-dequeue-scheduling logic 16 for frames traveling from the switch fabric to the Ethernet physical layer devices (EDS-Egress);
4. An ingress switch interface (Switch Ingress) 18 and egress switch interface (Switch Egress) 20 DASL links for interconnection to another network processor or intermediate switch;
5. A physical MAC multiplexer 22 receiving frames from the Ethernet or POS physical layer devices 26 (PMM-Ingress) and the physical MAC multiplexer 24 transmitting frames to the Ethernet or POS physical layer devices 26 (PMM-Egress).

Figure 2:
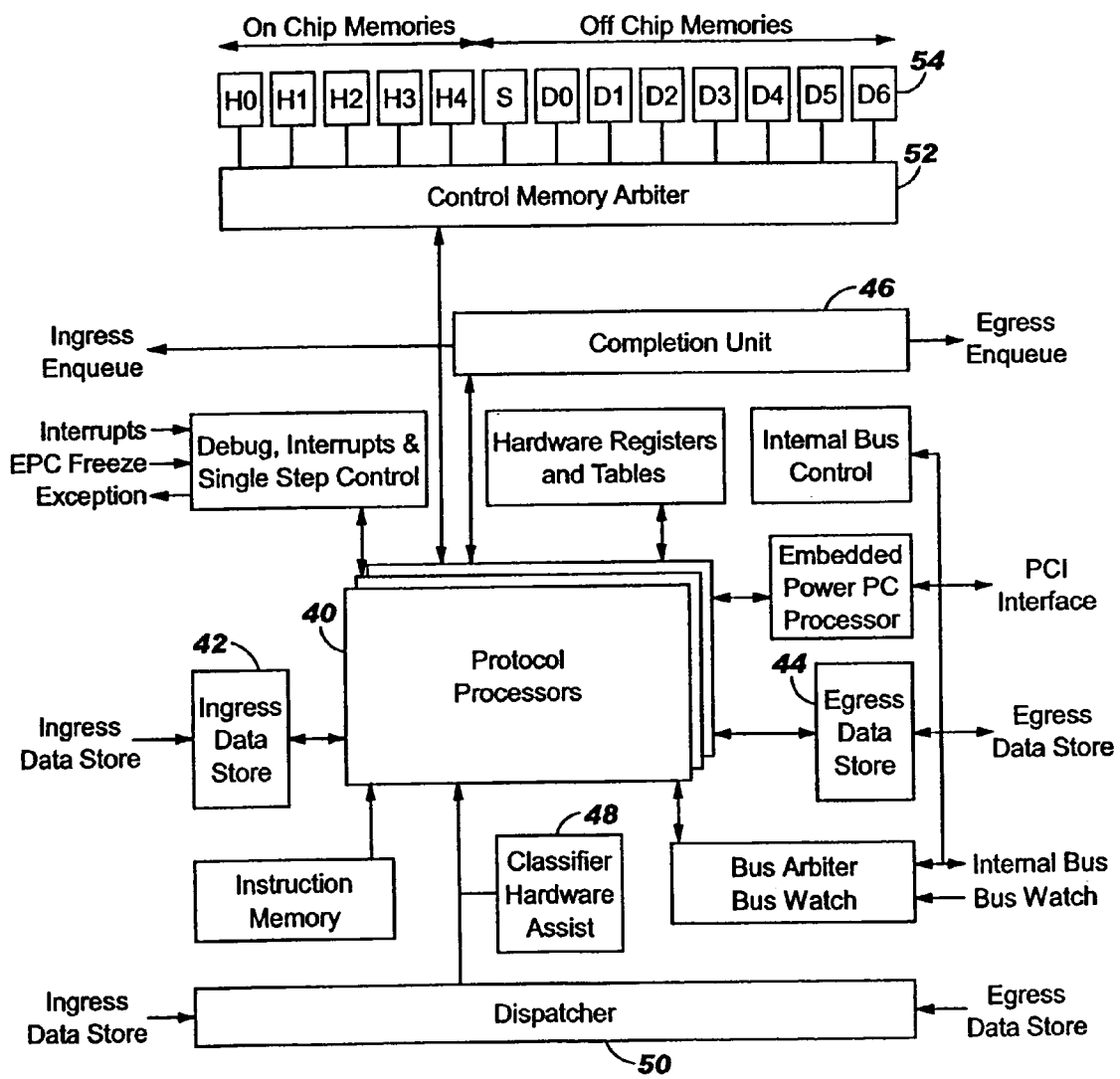
FIG. 2 illustrates an exemplary embodiment for an embedded processor complex in accordance with a preferred embodiment of the present invention.

FIG. 2 illustrates an exemplary embodiment for an embedded processor complex. It includes 16 protocol processors providing 2128 MIPS of processing power. Each protocol processor 40 includes a 3-stage pipeline (fetch, decode and execute), general purpose registers, special purpose registers, an eight instruction cache, a dedicated arithmetic logic unit (ALU) and coprocessors all running at 133 MHz. Two of the protocol processors are specialized: one for handling guided frames (the guided frame handler) and one for building look-up data in control memory (the generic tree handler).

Figure 3:
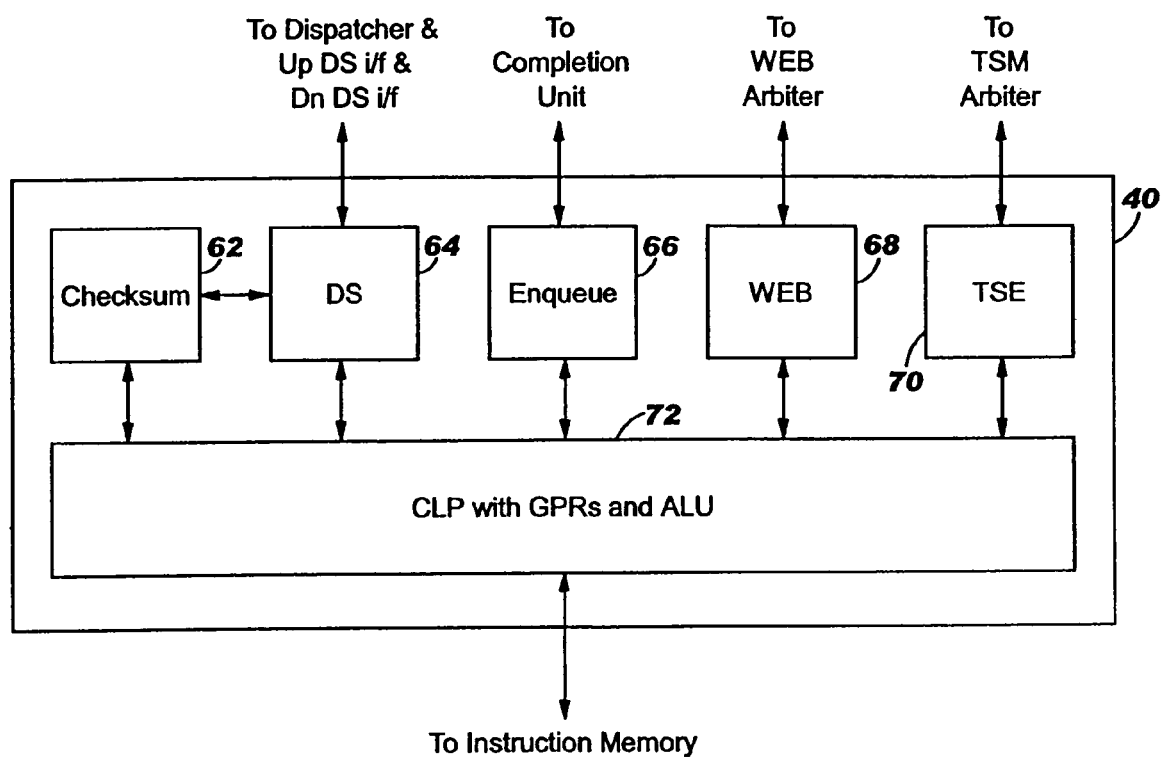
FIG. 3 illustrates an exemplary protocol processor structure in accordance with a preferred embodiment of the present invention.

FIG. 3 illustrates an exemplary embodiment of a protocol processor. The coprocessors associated with each of the programmable protocol processors 40 provide the following functions:

1. A data store coprocessor 64 interfaces frame buffer memory 42, 44 (ingress and egress directions) to provide direct memory access (DMA) capability;

2. A checksum coprocessor 62 calculates header checksums;
3. An enqueue coprocessor 66 controls access to the 256-bit working register, containing key frame parameters. This coprocessor interfaces with the completion unit 46 to enqueue frames to the switch and target port queues;
4. An interface coprocessor provides all protocol processors access to internal registers, counters and memory for debug or statistics gathering;
5. A string copy coprocessor enables efficient movement of data within the EPC;
6. A counter coprocessor manages counter updates for the protocol processors 40;
7. A policy coprocessor examines flow control information and checks for conformance with pre-allocated bandwidth.

Hardware accelerators 48 perform frame forwarding, frame filtering, frame alteration and tree searches. Other features incorporated into the network processor include innovative filter rule processing, hash functions and flow control.

The protocol processors 40 can enforce one hundred or more frame filter rules with complex range and action specifications. Filtering is essential for network security, and network processor hardware assists 48 provide wirespeed enforcement of these complex rule sets. Filter rules can deny or permit a frame or allocate quality of service (QoS) based on IP header information. Control point software for pre-processing rules automatically corrects logic errors. After a logically correct rule set has been entered, keys are formed from packet header information and are tested at wirespeed using the network processor's software managed trees.

Geometric hash functions exploit statistical structures in IP headers to outperform ideal random hashes. Consequently, the low collision rates enable high speed look-ups in full match tables without additional resolution searches.

Figure 15:
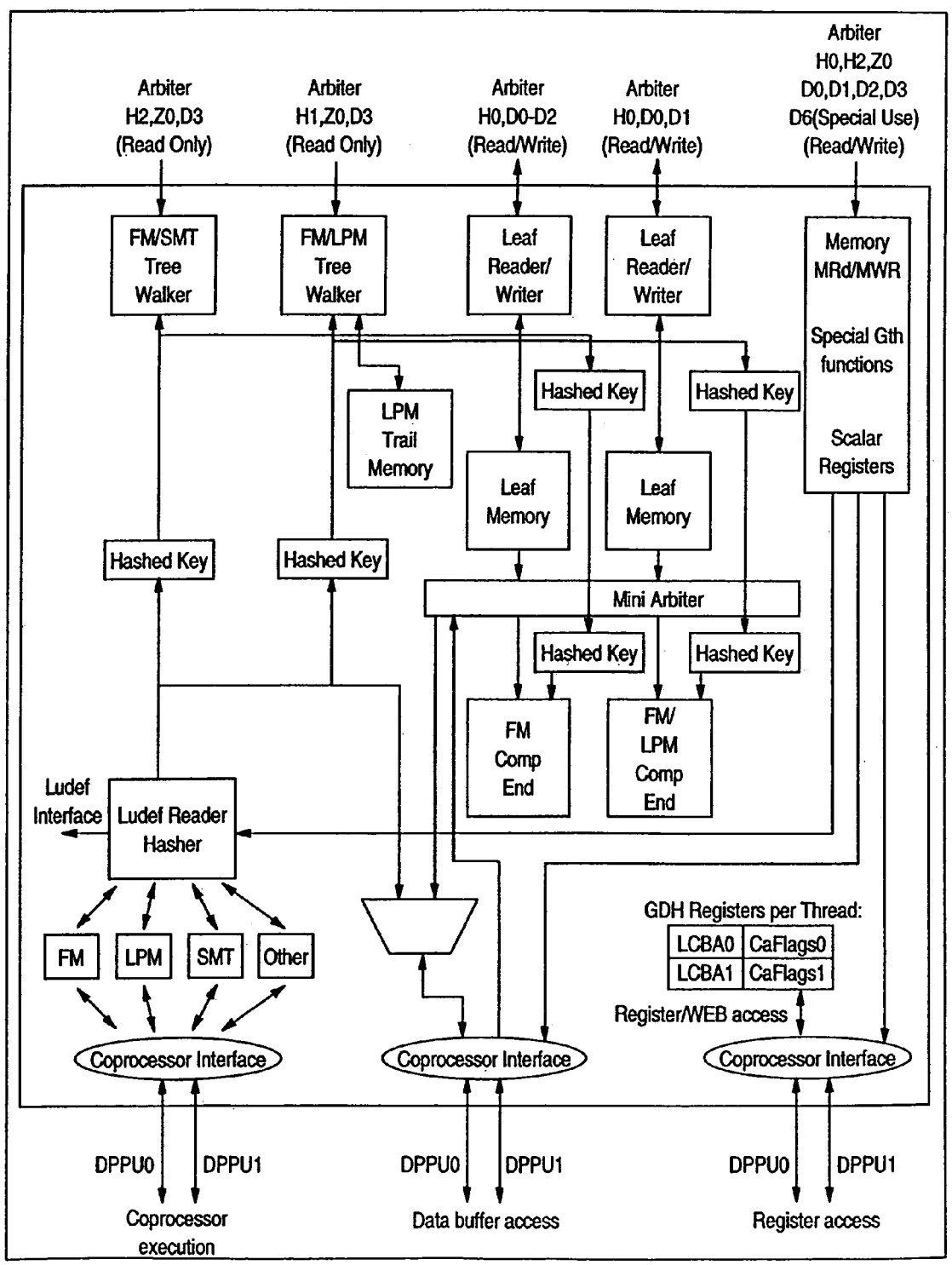
FIG. 15 illustrates an exemplary architecture for a tree search engine in accordance with a preferred embodiment of the present invention.

Operating in parallel with protocol processor execution, the tree search engine 70 performs tree search instructions (including memory read, write or read-write), memory range checking and illegal memory access notification. FIG. 15 illustrates an exemplary embodiment of a tree search engine.

Two system control options are available within the network processor 10. An internal processor 34 can function as the control point (CP) processor for the system or, alternatively, an external processor can be connected to one of the four Ethernet macros for initialization and configuration. The CP processor 34 communicates with other processor entities within the network processors by building special Ethernet frames called guided frames. Guided frames can be forwarded across the DASL links to other devices allowing one CP processor attached to a single Ethernet port to communicate with and control all of the network processor devices contained within the subsystem. The internal processor 34 of each network processor 10 can also communicate using a separate 32-bit PCI bus.

The network processor 10 usually resides on a subsystem board and provides the protocol layer (i.e., layer 2, layer 3, layer 4 and higher) frame processing. Software running on a CP processor 34 in the CP subsystem provides the management and route discovery functions. The CP code, picocode running on the protocol processors, and picocode running on the guided frame handler enable initialization of this system, maintenance of the forwarding paths, and management of the system. As a distributed system, the CP processor and each network processor subsystem contain multiple processors which operate in parallel and communicate using guided frames for increased efficiency and performance.

Data frames are received from the media by the PMM 22 and transferred to the data storage buffers 42. The PMM also performs CRC checking and frame validation during the receive process. The dispatcher 50 sends up to 64-bytes of frame information to an available protocol processor 40 for frame look-ups. The classifier hardware assists 48 supplies control data to identify frame formats. The protocol processor 40 uses the control data to determine the tree search algorithm to apply including fixed match trees, longest prefix match trees, or software managed trees.

Look-up is performed with the aid of a tree search engine (TSE)70. The TSE 70 performs control memory 72 accesses, enabling the protocol processor 40 to continue execution. The control memory 72 stores all tables, counters and any other data needed by the picocode. For efficiency, a control memory arbiter 52 manages control memory operations by allocating memory cycles between the protocol processors 40 and a variety of on-chip and off-chip control memory options 54.

The protocol processor 40 contains a primary data buffer, a scratch pad data buffer and control registers (collectively, 72) for data store operations. Once a match is found, ingress frame alterations, such as VLAN header insertion or overlay, can be applied. These alterations are not performed by the EPC 12. Instead, the ingress switch interface hardware 18 performs the alteration if the hardware flags are set. Other frame alterations can be accomplished by the picocode and the data store coprocessor 64 by modifying the frame contents held in the ingress data store 42.

Control data is gathered and used to build switch headers and frame headers prior to sending frames to the switch fabric. Control data includes switch information such as the destination of the frame, as well as information for the egress network processor, to help it expedite frame look-up of destination ports, multicast or unicast operations, and egress frame alterations.

Figure 4:
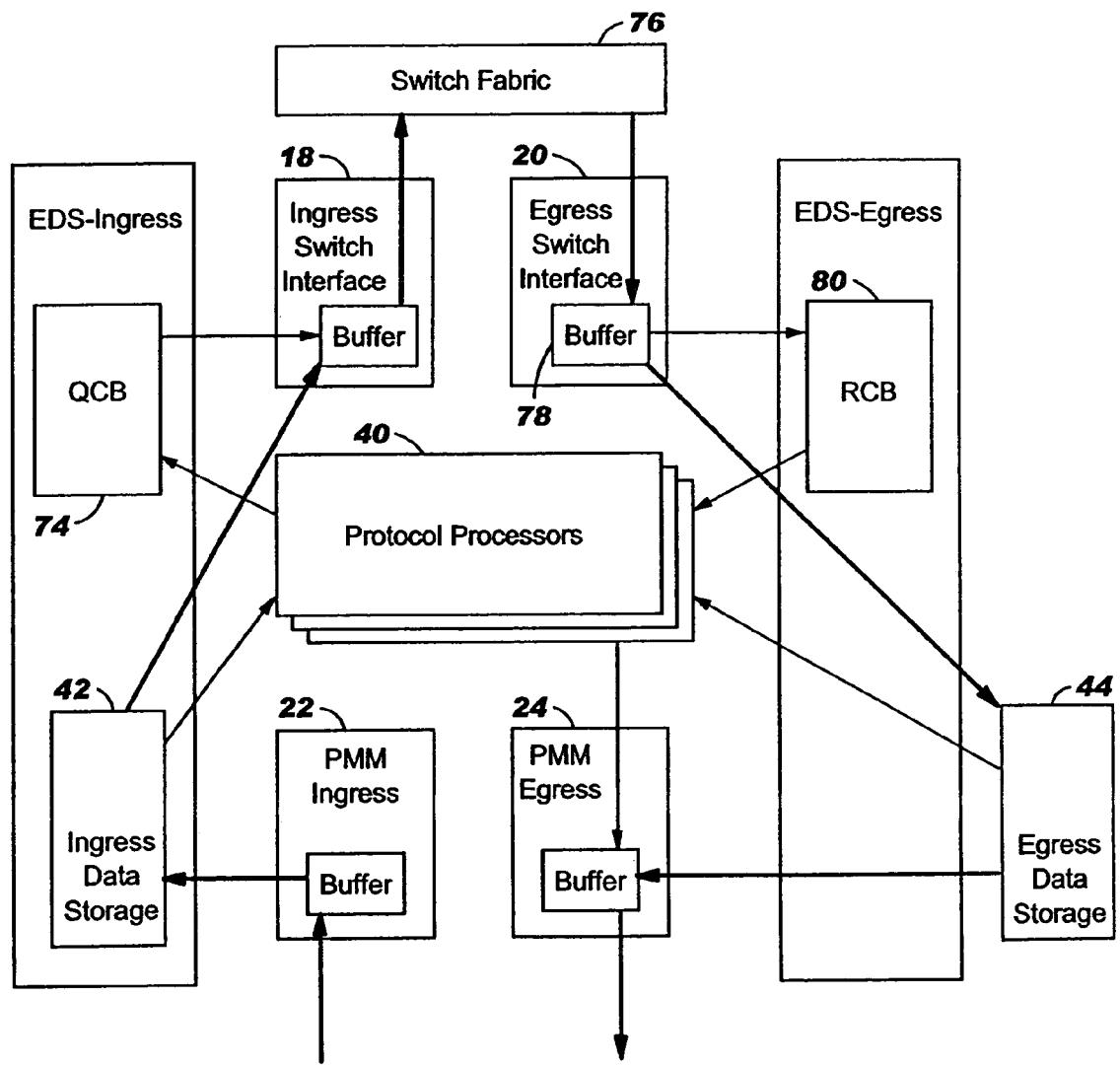
FIG. 4 illustrates exemplary ingress and egress frame flows in accordance with a preferred embodiment of the present invention.

FIG. 4 illustrates exemplary ingress and egress frame flows. Upon completion, the enqueue coprocessor 66 builds the necessary formats for enqueuing the frame to the queue control block (QCB)$_{74}$ and forwards them to the completion unit 46. The completion unit 46 guarantees frame order from the up to 16 protocol processors 40 to the switch fabric queues 76.

Frames from the switch fabric queues 76 are segmented into 64-byte cells with switch header and frame header bytes inserted as they are transmitted by the switch fabric 76.

Frames received from the switch fabric 76 are placed in egress data store buffers 78 using information provided by the reassembly control block (RCB) 80 and the EDS-Egress 44 and are enqueued to the EPC 12. A portion of the frame is sent by the dispatcher 50 to any idle protocol processor 40 for performing the frame look-ups. Frame data is dispatched to =the protocol processor 40 along with data from the classifier hardware assist 48. The classifier hardware assist 48 uses frame control data created by the ingress network processor to help determine the beginning instruction address for egress processing.

Egress tree searches support the same algorithms as are supported for ingress searches. Look-up is performed with the TSE 70, freeing the protocol processor 40 to continue execution. All control memory operations are managed by the control memory arbiter 52, which allocates memory access among the processor complexes.

Egress frame data is accessed through the data store coprocessor 64. The results of a successful look-up contains forwarding information and, in some cases, frame alteration information. Egress frame alterations can include VLAN header deletion, time to live increment (IPX) or decrement (IP), IP header checksum recalculation, Ethernet frame CRC overlay and MAC destination address or source address overlay or insertion. IP header checksums are prepared by the checksum coprocessor 62. Alterations are not performed by the embedded processor complex 12, but rather hardware flags are created and PMM egress hardware 24 performs the alterations. Upon completion, the enqueue coprocessor 46 is used to build the necessary formats for enqueuing the frame in the EDS egress queues 44 and forwards them to the completion unit 46. The completion unit 46 guarantees frame order from the up to 16 protocol processors to the EDS egress queues 44 feeding the egress Ethernet MACs. The completed frames are finally sent by the PMM egress hardware 24 to the Ethernet MACs or the POS interface and out the physical ports.

Figure 5:
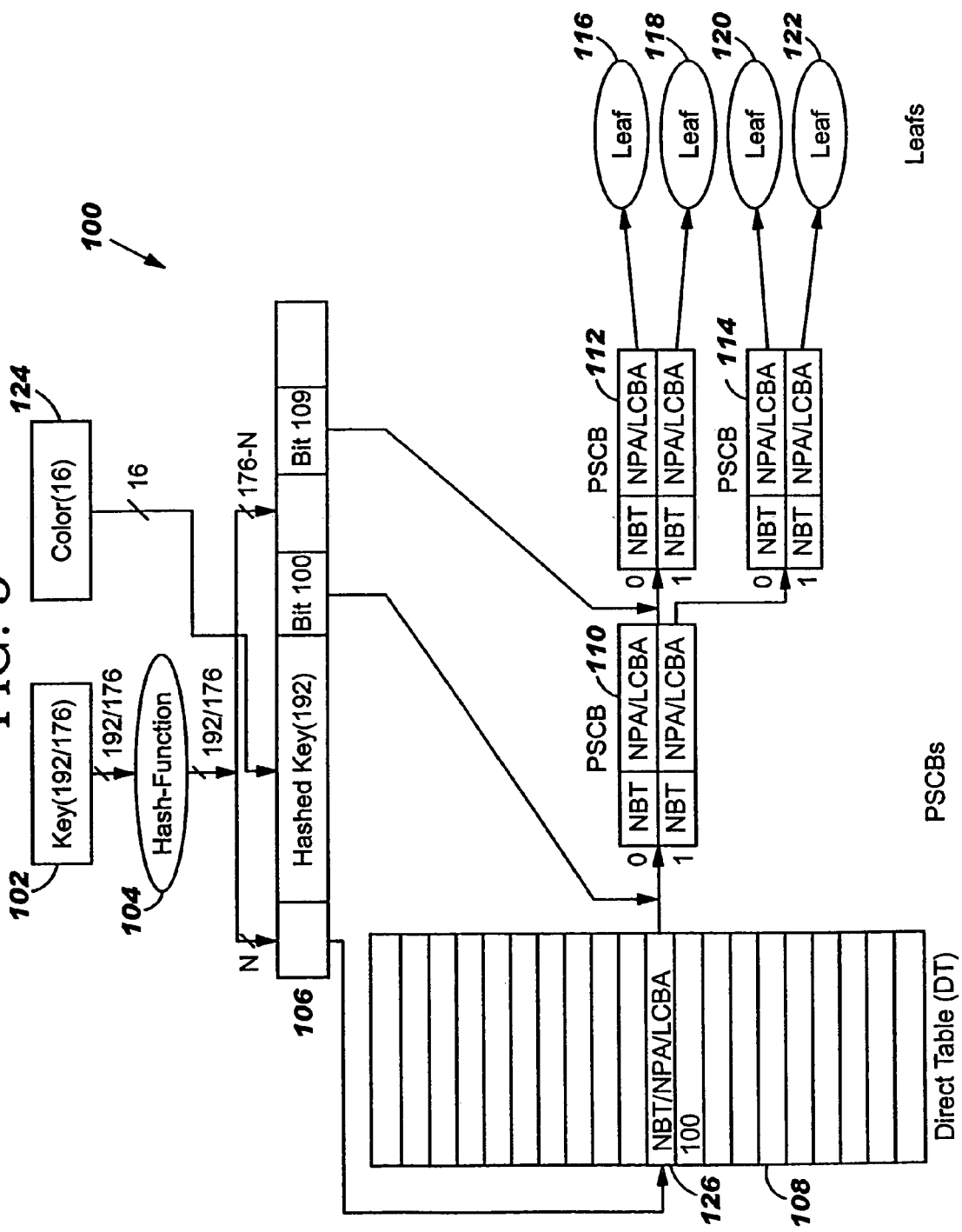
FIG. 5 illustrates a tree data structure for the full match search algorithm in accordance with a preferred embodiment of the present invention.

The tree search engine (TSE) 70, as depicted in FIG. 15, uses the concept of trees to store and retrieve information. Retrieval, i.e., tree-searches as well as inserts and deletes are done based on a key, which is a bit-pattern such as, for example, a MAC source address, or the concatenation of an IP source address and an IP destination address. An exemplary tree data structure 100 that can be modified for use in the present invention is depicted in FIG. 5. Information is stored in a control block called a leaf 116, 118, 120, 122, which contains at least the key 102(*the* stored bit pattern is actually the hashed key 106). A leaf can also contain additional information such as aging information, or user information, which can be forwarding information such as target blade and target port numbers. The format of a leaf is defined by picocode; the object is placed into an internal or external control store.

The search algorithm for trees operates on input parameters including the key 102, performs a hash 104 on the key, accesses a direct table (DT)108, walks the tree through pattern search control blocks (PSCBs)110,112, 114 and ends up at a leaf 116, 118, 120, 122. Each type of tree has its own search algorithm causing the tree-walk to occur according to different rules. For example, for longest prefix match (LPM) trees, the data structure is an extension to a Patricia tree. When a leaf has been found, this leaf is the only possible candidate that can match the input key 102. A "compare at the end" operation compares the input key 102 with the pattern stored in the leaf. This verifies if the leaf really matches the input key 102. The result of this search will be success (OK) when the leaf has been found and a match has occurred, or failure (KO) in all other cases.

The input to a search operation contains the following parameters:

key
The 176 bit key must be built using special picocode instructions prior to the search or insert/delete. There is only one key register. However, after the tree search has started, the key register can be used by the picocode to build the key for the next search concurrently with the TSE 70 performing the search. This is because the TSE 70 hashes the key and stores the result in an internal HashedKey register 106.

key length
This 8 bit register contains the key length minus one bit. It is automatically updated by the hardware during the building of the key.

LUDefIndex
This is an 8 bit index into the lookup definition table (LUDefTable), which contains a full definition of the tree in which the search occurs. The internal structure of the LUDefTable is illustrated in FIG. 12.

TSRNr
The search results can be stored either in 1 bit Tree Search Result Areas TSR0 or TSR1. This is specified by TSRNr. While the TSE is searching, the picocode can access the other TSR to analyze the results of a previous search.

color
For trees which have color enabled (specified in the LUDefTable), the contents of a 16 bit color register 124 is inserted in the key during the hash operation.

For LPM trees, the input key will be hashed into a HashedKey 106, as shown in FIG. 5. In the preferred embodiment, no hash function is performed on the input key for LPM trees, and the hashed output equals the input key. The hash algorithm (including no hash for LPM trees) that will be used is specified in the LUDefTable.

The lookup definition table is the main structure which manages tree search memory. The LUDefTable is an internal memory structure and contains 128 entries for creating trees. The LUDefTable contains entries that define the physical memory the tree exists in (e.g., DRAM, SRAM, internal RAM), whether caching is enabled, the size of the key and leaf, and the type of search action to perform. The LUDefTable is implemented as three separate random access memories—one RAM that is accessible only by the general processor tree handler (GTH) and two RAMs that are duplicates of each other and are accessible by all picoprocessors.

The output of the hash function 104 is always a 176-bit number which has the property that there is a one-to-one correspondence between the original input key 102 and the output of the hash function 104. As will be explained below, this property minimizes the depth of the tree that starts after the direct table 108.

If colors are enabled for the tree, which is the case in the example of FIG. 5, the 16-bit color register 124 is inserted in the 176-bit hash function output and the file result is a 192-bit number, called the HashedKey 106. The insertion occurs directly after the direct table 108. If the direct table 108 contains $_2N$ entries, then the 16-bit color value is inserted at bit position N, as shown in FIG. 5. The output of the hash function, together with the inserted color value, is stored in the HashedKey register 106. If colors are disabled for a tree, the 176-bit hash function is taken unmodified, and 16 zeros are appended to the hash output to produce the 192-bit final HashedKey.

Colors can be used to share a single direct table 108 among multiple independent trees. For example, one use of a color could be a VLAN ID in a MAC source address (SA) table. In this case, the input key 102 would be the MAC SA, and the color 124 would be the VLAN ID (since the VLAN ID is 12 bits, four bits of the color would be unused, i.e., set to zero). After the hash function 104, the pattern used is 48+16=64 bits. The color is now part of the pattern and will distinguish between MAC addresses of different VLANs.

The hash function 104 is defined such that most entropy in its output resides in the highest bits. The N highest bits of the HashedKey register 106 are used to calculate an index into the direct table (DT) 108.

To achieve storage as well as search efficiency, this invention makes use of the following data structures:
1. pattern/key that needs to be searched;
2. direct table (DT) entry;
3. pattern search control block (PSCB); and
4. leaf.

A DT entry is the first address location based on the first "n" bits of the key. It includes a combination of 5 parts. A DT entry either has a shape defined by a width of one and a height of one, or a width of one and a height of two as described further below. A PSCB entry represents an intermediate node location. A leaf entry is the address location for the search result.

A PSCB represents a branch in the tree. In the preferred embodiment there is a 0-branch and a 1-branch. The number of branches emanating from a PSCB is variable depending on the number of bits used to designate the branches. If n bits are used, then $2^n$ branches are defined at that PSCB. Each PSCB is also associated with a bit position p. All leaves that can be reached from the PSCB through the 0-branch have a '0' at position p in the pattern, and the leaves that can be reached through the 1-branch have a 1 at position p. Furthermore, all leaves that can be reached from a PSCB will always have patterns at which bits 0 . . . p−1 are identical, i.e., the patterns start to differ at position p. The bit position associated with a PSCB is stored in the previous PSCB or in a DT entry and is called the NBT (i.e., next bit to test).

Thus, PSCBs are only inserted in the tree at positions where leaf patterns differ. This allows efficient search operations since the number of PSCBs, and thus the search performance, depends only on the number of leaves in a tree and not on the length of the patterns. The PSCB register format is depicted in FIG. 13.

LPM PSCBs have either a shape defined by a width of one and a height of one, or a width of one and a height of two, depending on the memory in which the PSCB resides. A memory that has a line width of at least 64 bits (H0, H1, H2, DRAM) should be used with a height of one. A memory of 36 bits (H3, H4, ZBT) should be used with a height of two.

The formats for a DT and a PSCB entry are identical and include the following parts:
2. SCB (search control block) 2 bits.
3. NPA (next pattern address): points to the next PSCB address.
4. LCBA (leaf control block address): points to the leaf/result.
5. NBT (next bit or bits to test) can be next pair or group "x" (x=1 or n) bits to test . . . The number of bits to be tested is determined based on the storage efficiency, etc.
6. Direct leaf.

Each entry in this exemplary implementation is 64 bits wide and contains one of three possible currently defined entries.
1. Empty DT Entry: SCB=00 and NPA=0 and the LCBA/NBT are not valid or 0.
2. The NPA/NBT is valid but the LCBA is not valid: SCB= 00 and NPA=non-zero and NBT is valid. The LCBA can be zero or non-zero. For a DT entry NPA points to the first intermediate node and the NBT points to the bit or bits to be tested. In the case of a PSCB entry, the NPA points to other nodes in the trail.
3. The LCBA is valid and the NPA/NBT is valid: SCB= 01 and NPA/NBT/LCBA is non-zero. The LCBA points to an associated leaf address, i.e., search result. The NPA points to the next PSCB address and the NBT points to the test bit or bits.
4. The LCBA is valid and the NPA/NBT is not valid: SCB 01 and NPA=zero. LCBA points to an associated leaf address, i.e., a search result. It indicates the end node.
5. Direct leaf: SCB=10 and the rest of the data contains the search result or leaf. Part of the leaf data can include chaining of leaf addresses to support a large search result storage or leaf.

With regard to memory allocation, LPM PSCBs have the same structure as LPM DT entries except that they always consist of $2^{**}no\_of\_bits\_to\_be\_tested$ addresses, i.e., in pairs/groups. These pairs or groups of addresses are allocated consecutively in memory and are used as a branch/jump pointer for walking the tree.

The format of a leaf in a LPM tree contains control information including a pattern. The pattern identifies the leaf as unique in the tree. A leaf also contains the data needed by the application that initiated the tree search. The data contained in a leaf is application dependent and its size or memory requirements are defined by the LUDefTable entry for the tree. FIG. 14 illustrates the leaf format for LPM trees.

The high level algorithm flow for the longest prefix match search is as follows:
1. Read the DT entry.
   a. if NBT<current_keyLen then read the next PSCB and store the bird/LCBA and the previous NBT in the stack (if present);
   b. if NBT>current keylen then read the leaf at the LCBA and go to the leaf evaluation step;
   c. if NBT is not valid and a direct leaf is valid, read the leaf contents and go to the leaf evaluation step;
   d. if NBT is not valid and/or the leaf/bird is not present; return KO, i.e., failure for the search result and completion flag as done.
2. Read the PSCB/NPA entry.
   a. if NBT<current_keylen then read the next PSCB and store the bird in the stack (if present);
   b. if NBT>current_keylen then read the leaf at the LCBA and go to the leaf evaluation step;
   c. if NBT is not valid and a direct leaf is valid, read the leaf contents and go to the leaf evaluation step;
   d. if NBT and/or NPA is not valid and a leaf/bird is not present then read the bird stack and read the leaf at the most recent (last) valid LCBA and then go to the leaf evaluation step.
3. Leaf evaluation: compare the pattern (key) and the pattern stored in the leaf and compute the mismatch point, i.e., DistPos value.
   a. compare the DistPos value with the NBT field within the stack and read the corresponding leaf (i.e., the LCBA) with the closest matching NBT and return with OK (success);
   b. if all the NBTs are greater than DistPos, return the result with KO (failure) since no matching leaf/subnet was found.

If the stack is full before the end of the trail, there will be a need for reading the leaf at the intermediate point also to determine whether to flush the trail.

The trail stack allows the ability to find the longest prefix result after the first compare without requiring the walking of the tree to the tail again. The use of a smaller trail stack is possible but requires comparison of the leaf every time the trail gets full. It is possible to arrive at the longest prefix result/leaf without having a trail stack but in that case one has to walk the trail again until the bird is located at the NBT=DistPosVal (first mismatch position) or the last valid bird is located for prefix_length<DisPosVal. The trail stack supports various memories and it is scalable.

The bit/register width values described herein are exemplary and can be changed to different values to optimize the available memories, performance requirements, etc.

The search starts with an access into the direct table 108, i.e. a DT entry is read from the direct table 108. The address used to read the DT entry is calculated from the N highest bits of the HashedKey in register 106, as well as on tree-properties as defined in the LUDefTable. The DT entry can be seen as the root of a tree. The actual tree data structure depends on the tree-type. Extensions to a Patricia tree data structure are used for LPM trees.

An example of the use of an 8 entry DT 108 is shown in FIG. 5. It can be seen that the search time, i.e., the number of PSCBs that must be accessed, can be reduced by using a DT 108. Thus, by increasing the DT size, a trade-off can be made between memory usage and search performance.

For performance reasons, it is inefficient to read a DT entry only to find that it contains a pointer to a leaf, after which the leaf itself must be read. The concept of a direct leaf allows a trade-off between more memory usage and better performance.

A tree can have direct leaves enabled, which is specified in the lookup definition table (LUDefTable). The difference between trees with direct leaves enabled and disabled is illustrated in FIG. 7. When direct leaves are enabled and a DT entry contains a single leaf, this leaf is stored directly in the DT entry itself. Otherwise, the DT entry will contain a pointer to the leaf.

Shaping is a feature of the tree search memory (TSM) and is used to specify how an object, like a leaf or a PSCB, is stored in the TSM. The shape is defined by the parameters width and height. The height of an object denotes the number of consecutive address locations at which the object is stored. The width of an object denotes the number of consecutive banks at which the object is stored. For width and height, the hardware automatically reads the appropriate number of locations. From a picocode point of view, an object is an atomic unit of access. The width must always be 1 for objects stored in SRAM. The width may be greater than 1 for objects in DRAM. Objects that are small enough to fit within a single memory location are defined to have a height and a width of one. The shape of a DT entry with direct leaves disabled is always (W=1, H=1). When the DT entry is stored in dynamic random access memory (DRAM), it occupies exactly 64 bits. The shape of a DT entry with direct leaves enabled equals the shape of the leaf, which is specified in the LUDefTable. In general, this causes more memory to be used by the DT 108. It also causes an impact of the leaf shape on the DT entry address calculation.

After a DT entry has been read and assuming the DT entry does not contain a direct leaf nor is it empty, the search continues by walking the tree that starts at the DT entry. The tree-walk may pass several PSCBs (pattern search control blocks), until a leaf has been reached.

When a PSCB is encountered during a search in an LPM tree, the tree search engine hardware 70 will continue the tree-walk on the 0-branch or the 1-branch, depending on the value of the bit p of the UnhashedKey.

Figure 11A:
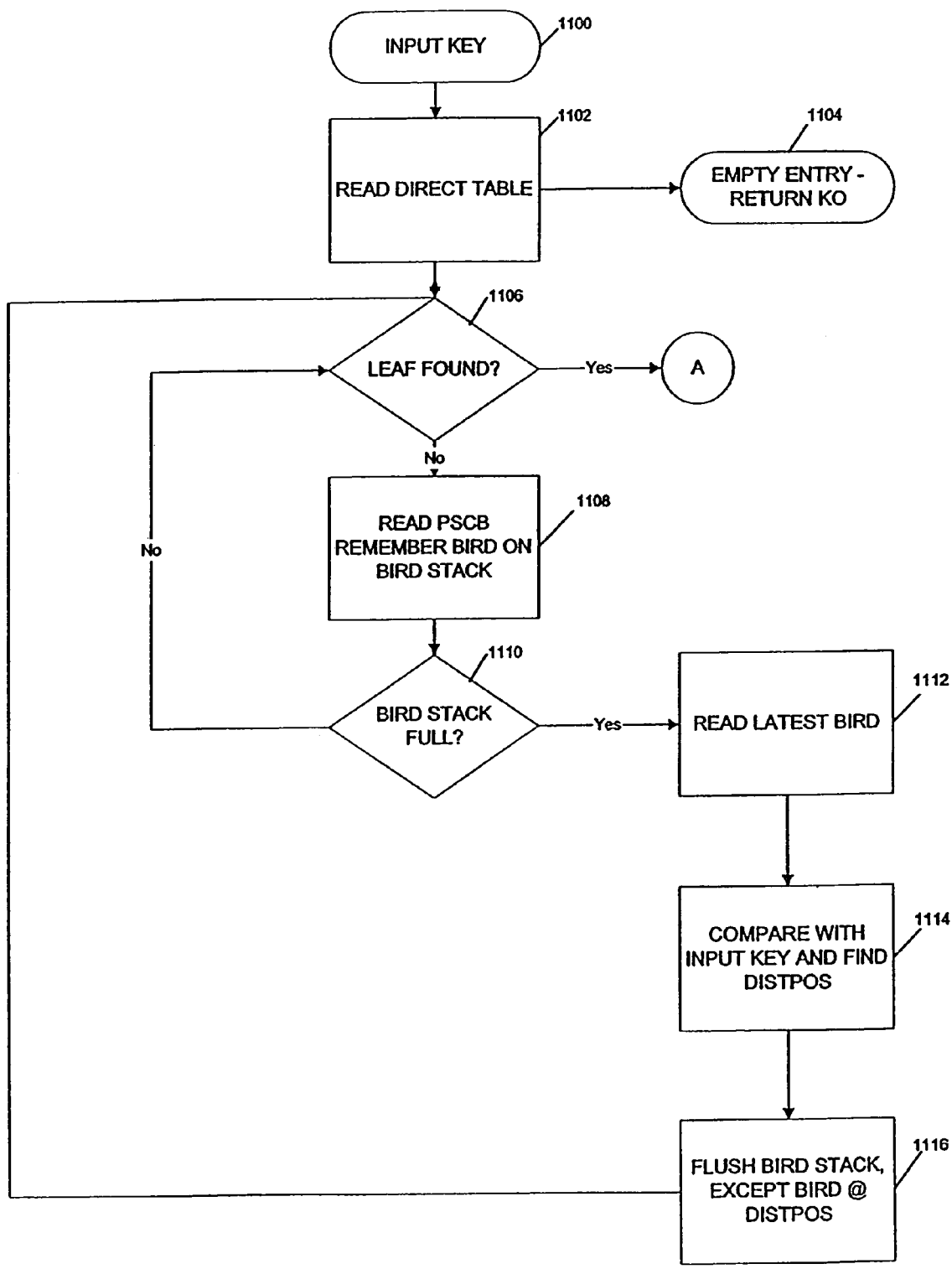
FIGS. 11A–11B illustrate the processing logic of the Longest Prefix Match (LPM) search algorithm in accordance with a preferred embodiment of the present invention.
Figure 11B:
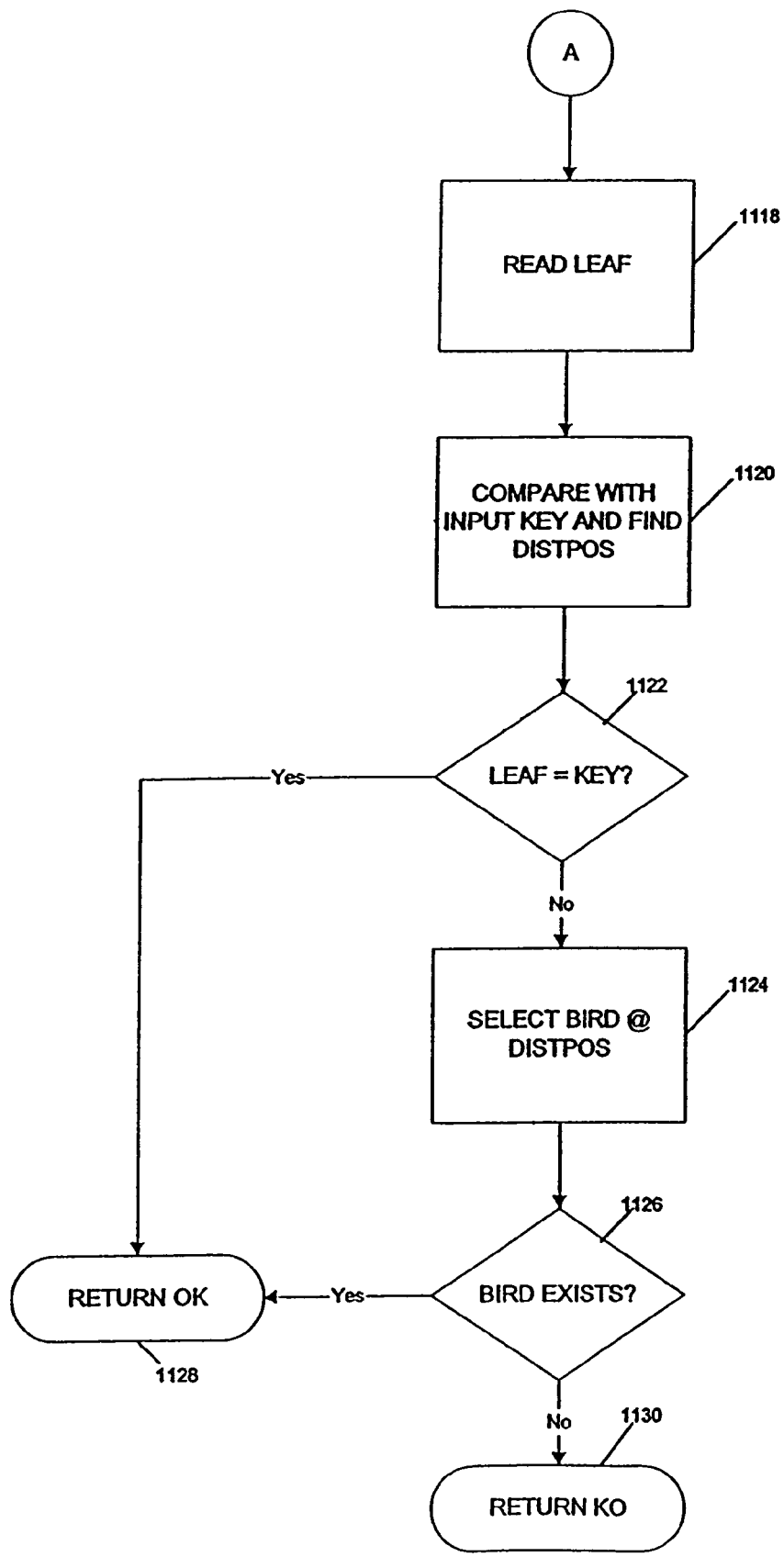

FIGS. 11A–11B illustrate the processing logic of the Longest Prefix Match search algorithm of the present invention. The algorithm begins in logic block 1100 with the reading of an input key. In an LPM search, there is no hash function, therefore the hashed key is identical to the input key. As indicated by logic block 1102, the direct table is next read. The upper N bits (whereby N is configurable) of the hashed key are used as an index into a direct table. When the entry that has been read is empty, the search returns KO (nothing found) as indicated by termination block 1104.

It should be noted that for Internal Protocol version 4 (IPv4), a special mechanism for class A addresses can be employed. If the entry points to a leaf in decision block 1106, then processing continues at block 1118 in FIG. 11B. Otherwise, the entry points to a PSCB. The appropriate part of a PSCB is then read as indicated in logic block 1108. For an LPM search, a PSCB includes two entries: a zero-part and a one-part. The previous PSCB (or DT entry) contains a bit number (NBT: next bit to test). The NBT selects a bit in the hashed key (i.e., zero or one), which selects the PSCB entry to use. The PSCB entry either contains a pointer to a leaf, or a pointer to another PSCB, or both. In the latter case, the leaf is called a "bird". That is, a PSCB can contain a bird and a pointer to another PSCB, thus, a leaf is always an endpoint in a tree branch.

A bird is always in the middle of a tree branch, since a pointer to a PSCB represents a continuation of a tree branch. When a PSCB entry is read, and it contains a bird, the bird is remembered on a bird stack, together with its bit position as indicated in logic block 1108. When the bird stack is not full in decision block 1110, the search continues with reading the next PSCB by returning to decision block 1106. When the bird stack is full in decision block 1110, it will be flushed as follows. The bird contents are read from memory as indicated by logic block, 1112. Next, as indicated in logic block 1114, the pattern in the bird is compared with the hashed key. When they are exactly equal bit-for-bit and have the same length, the search can end with OK. The value of DistPos is calculated. This is the first bit at which the bird pattern and the hashed key differ. For example, DistPos (1010111, 10001000100)=2, i.e., bit 2, counting from 0 is the first bit where the two patterns differ. If there is a bird in the bird stack with a bit number equal to DistPos, this bird is selected, otherwise the bird with the largest bit number that is still smaller than the DistPos is selected. This bird is kept in the bird stack; all other birds are removed. Therefore, the bird stack contains exactly one bird. The search continues. It should be noted that the LPM search can be aborted as soon as the bit number of the PSCB exceeds the length of the hashed key. This processing is indicated by logic block 1116. From logic block 1116, processing returns to decision block 1106 to continue testing for a leaf being found.

When a leaf is found in decision block 1106, then processing continues at logic block 1118 in FIG. 11B. Once the leaf is read, it is compared with the hashed key (input key). When the hashed key and leaf pattern are exactly equal bit-for-bit and have the same length, the search can end with OK. This processing is indicated by decision block 1122 and termination block 1128, respectively. Otherwise, the DistPos is calculated and the appropriate bird in the bird stack is selected as indicated in logic block 1124. If a bird exists as indicated in decision block 1126, then the search returns OK as indicated in termination block 1128. Otherwise, the search returns KO as indicated in termination block 1130.

Internet Protocol version 4 (IPv4) class A addresses have a prefix length of 8 bits or higher. This means that it must be possible to store patterns in the tree with a length of 8 or higher. A problem may occur with a DT size larger than 256 ($2^8$). Assume as an example a DT size of 64K entries, which represents a 16-bit address to index into the DT. Assume also a class A address equal to "0101010101", with length 10 that must be stored in a table. Any input pattern that has this 10-bit prefix must return the above pattern. This poses a problem with a 16-bit DT index. For example, input key k1 "0101010101000000" and input key k2

"0101010101000001" should both find the same result; however, they address different entries in the DT. This problem can be solved in two ways.

First, the address can be duplicated multiple times in the tree. In this example, the address must be duplicated 2⁶=64 times. Second, a different way of calculating the DT index can be used. When an input key is a class A address, which is the case if the leftmost bit equals zero, the eight rightmost bits in the DT index are set to zero. In the current example, both input keys k1 and k2 use "01010101" as an index in the DT.

A cache can be used for increasing the search performance in trees. Use of a cache can be enabled in the LUDefTable on a per tree basis. During a search, the tree search engine 70 will first check in the cache to determine if a leaf is present that matches the HashedKey. If such a leaf is found, it is returned and no further search is required. If such a leaf is not found, a normal search starts.

For the tree search engine hardware 70, a cache look-up is exactly identical with a normal search. Thus, the input key is hashed into a HashedKey, and a direct table 108 access is performed. The direct table 108 acts as a cache. When the cache search returns OK (success), the search ends. Otherwise, the tree search engine 70 starts a second search in the full tree—except that no hash operation is performed. The contents of the HashedKey register 106 are reused.

It can be specified in the LUDefTable if a cache search is used. If a cache search uses LUDefTable entry I and the search ends KO (failure), another search using LUDefTable entry I+1 starts automatically. In principle, this allows multiple searches to be chained, although it is recommended that the full tree be stored under LUDefTable entry I+1.

The tree search engine 70 provides hardware search operations in FM trees, LPM trees and SMT trees. For all tree types varying amounts of software are required to initialize and maintain a tree. Only FM trees and LPM trees have the capability that insertion and removal of leaves can be done without the intervention of control point processor 34. The use of this feature allows for a scalable configuration and still has the flexibility to allow the CP 34 to insert or remove leaves if needed.

LPM trees provide a mechanism for searching tables efficiently with variable length patterns or prefixes. An example of this would be a layer 3 Internet Protocol (IP) forwarding table. IP addresses can be full match addresses such as a host address or can be a prefix for a network address. LPM trees are managed by the CP and also require assistance from the GCH for inserting and removing leaf entries.

The structure of an LPM DT entry differs from an FM DT entry: the LPM DT entries contain both a node (NPA) and leaf (LCBA) address within the same entry. In the FM DT, an entry cannot contain both a node and a leaf address. This difference is due to the searching strategy used between the two tree types.

The structure of a DT entry for an LPM tree is illustrated in FIG. 8. Each DT entry is 64-bits wide and contains one of three possible entry formats that are currently defined:

Empty DT entry (format=00 and NPA=0) There are no leaves associated with this DT entry (the next PSCB address (NPA), next bit to test (NBT) and leaf control block address (LCBA) fields contain all zeros).

LCBA not valid and NPA/NBT valid (format=00 and NPA <>0). The DT entry contains a pointer to a PSCB. The NPA and NBT fields are valid. The LCBA pointer contain all zeros. This code point may seem redundant and is added in the hardware only for the case that the PSCB or the DT entry is stored in a 36-bit wide memory. In this case, the hardware can skip reading the memory location containing the LCBA, which improves TSM bandwidth and therefore search performance.

LCBA valid and NPA/NBT not valid (format=01 and NPA=0). There is a single leaf associated with the DT entry. The LCBA contains a pointer to this leaf. There is no pointer to a next PSCB (NPA=0).

LCBA valid and NPA/NBT valid (format=01 and NPA <>0). There is a leaf associated with the DT entry (the LCBA contains a pointer to this leaf) and there is a pointer to the next PSCB (NPA <>=0).

Direct leaf (format=10). There is a single leaf associated with the DT entry and the leaf is stored in the DT entry itself. The first field of the leaf must be the NLA rope which implies that direct leaves must have the rope enabled. A rope is a circular linked list that is used to link leaves in a tree together. Picocode can "walk the rope" or sequentially inspect all leaves in a rope. It should be noted that the first two bits in the NLA are reserved to denote '10' such that they automatically encode "direct". Direct leaves will only be used for a given tree if this is enabled in the LUDefTable.

LPM PSCBs have the same structure as an LPM DT entry except that they consist of two PSCB lines, whereby each PSCB line can have one of the formats shown in the figure. The two lines are allocated consecutively in memory and are used as a branch for walking the tree. Note that one of the two LPM PSCB lines can be an empty line which is not allowed for FM PSCBs.

Figures 9, 10:
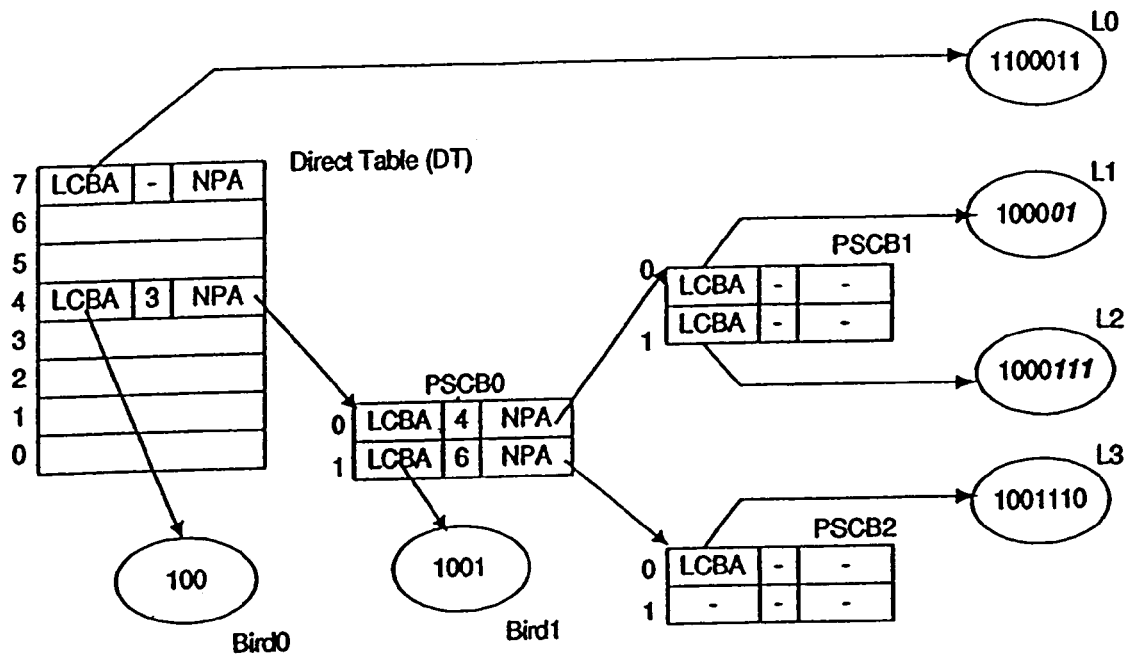
FIG. 9 illustrates an example of a search using a Longest Prefix Match search in accordance with a preferred embodiment of the present invention.
FIG. 10 illustrates examples of the calculation of a distinguishing position (DistPos) between an input key and a leaf pattern in accordance with a preferred embodiment of the present invention.

An example of an LPM tree is shown in FIG. 9. The tree contains an 8-entry DT (thus using 3-bit DT addressing), three LPM PSCBs, four leaves and two "birds." A bird is actually identical to a leaf, although it is called a "bird" only when the PSCB line contains both an LCBA pointer (pointing to the bird) and an NPA pointer (pointing to the next PSCB). The leaf is called a leaf when the PSCB line only contains an LCBA pointer and no NPA pointer. It can be seen in the figure that Bird0 (with pattern 100) is a prefix of Bird1 (with pattern 1001), which is in turn a prefix of leaf L3 (with pattern 1001110).

As an example, assume a search for input key 1001110. In this case, the tree walk proceeds in exactly the same way as with an FM search and the algorithm will reach leaf L3. Like an FM search, an LPM search also performs a compare at the end operation when a leaf has been reached in the tree. When the compare matches exactly, as is the case in this example, the correct leaf has been found and the search returns OK 15; (success).

In contrast, with an FM search, the LPM algorithm performs the following extra action to find a subnet when there is no exact match. The distinguishing positioning (DistPos) which is the first bit in which the input key and leaf pattern differ is calculated by hardware. Assume for example an input key of 10011 and a leaf pattern 1011010. The DistPos (10011, 1011010)=2 since the first bit where these two patterns are different is bit two. Other examples are shown in FIG. 9. Once the DistPos has been determined, there are two possibilities:

1. The DistPos equals the length of the input key and the length of the leaf pattern is smaller than the length of the input key. This would occur with an input key of 10011100, which during a search by the TSE would also find leaf L3. In this case, the leaf is the longest prefix of the input key and the algorithm returns an OK (success)

2. For all other keys, the TSE checks if there is a bird that represents a prefix of the input key. If the input key is 10011, the search again will find leaf L3 and begin looking for a prefix bird. Note that during the tree-walk, two birds would be encountered, Bird0 at bit2 and Bird1 at bit3. It should be noted that the bit position of a bird always equals the length of the bird. The DistPos (10011, 1001110)=4. Given the DistPos, the appropriate bird, i.e., the longer prefix, is the bird with the highest bit position, which in this example is Bird1. Thus, the TSE will read Bird1 from the tree search memory and return OK (success). It should be noted that a compare at the end operation is not required, since the bird is known to be a prefix of the input key.

The present invention can be realized in hardware, software, or a combination of the two. Any kind of computer system or other apparatus adapted for carrying out the methods described herein is suited. A typical combination of hardware and software could be a general purpose computer system that, when loaded and executed, controls the computer system such that it carries out the methods described herein. The present invention can also be embedded in a computer program product, which comprises all the features enabling the implementation of the methods described herein, and which when loaded in a computer system, is able to carry out these methods.

Computer program instructions or computer program in the present context mean any expression, in any language, code (i.e., picocode instructions) or notation, of a set of instructions intended to cause a system having an information processing capability to perform a particular function either directly or after either or both of the following occur: a) conversion to another language, code or notation; b) reproduction in a different material form.

Those skilled in the art will appreciate that many modifications to the preferred embodiment of the present invention are possible without departing from the spirit and scope of the present invention. In addition, it is possible to use some of the features of the present invention without the corresponding use of other features. Accordingly, the foregoing description of the preferred embodiment is provided for the purpose of illustrating the principles of the principles of the present invention and not in limitation thereof, since the scope of the present invention is defined solely by the appended claims.

What is claimed is:

1. A method for determining a longest prefix match for a variable length search key by a computer processing device, comprising:

reading an input key as a search string:

using the N most significant bits of the input key as an address to index into a table representing a plurality of root nodes of search trees wherein each non-empty entry contains a pointer to a next branch in the search tree or a leaf;

determining if the pointer in a non-empty table entry points to a leaf or a next branch of the corresponding search tree;

reading the next branch contents if the pointer does not point to the leaf of the corresponding search tree and comparing the prefix represented by the next branch with the input key to find a distinguishing bit position;

reading a leaf pattern when the leaf of a corresponding search tree is reached and comparing the leaf pattern with the input key to determine if the leaf pattern matches the input key; and returning the longest prefix match found for the input key to a requesting application.

2. The method for determining the longest prefix match of claim 1 wherein the table representing a plurality of root nodes of search trees contains $2^N$ entries.

3. The method for determining the longest prefix match of claim 1 wherein the computer processing device is a network processor.

4. The method for determining the longest prefix match of claim 1 wherein the contents of the next branch of the corresponding search tree points to another next branch.

5. The method for determining the longest prefix match of claim 1 wherein the contents of the next branch points to the leaf of the corresponding search tree.

6. The method for determining the longest prefix match of claim 1 wherein the contents of the next branch points to both a bird and to another next branch of the corresponding search tree.

7. The method for determining the longest prefix match of claim 6 wherein the bird represents a special type of leaf that represents a partial prefix match of the input key.

8. The method for determining the longest prefix match of claim 7 wherein the bird is placed on a bird stack along with an associated bit position.

9. The method for determining the longest prefix match of claim 8 further comprising testing the bird stack to determine if it is full.

10. The method for determining the longest prefix match of claim 9 further comprising, if the bird stack is not full, reading the contents of the next branch of the corresponding search tree.

11. The method for determining the longest prefix match of claim 9 further comprising, if the bird stack is full, flushing the bird stack.

12. The method for determining the longest prefix match of claim 11 wherein flushing the bird stack comprises the acts of:

reading the contents of the birds from a memory location;

comparing the input key with the pattern stored in the contents of the bird memory location;

determining a distinguishing position which represents a first bit at which the bird pattern and the input key differ;

selecting the bird with the largest bit number that does not exceed the distinguishing position to keep in the bird stack; and removing all other birds in the bird stack.

13. The method for determining the longest prefix match of claim 1 further comprising terminating the search for the longest prefix match when the bit number of the next branch exceeds the length of the input key.

14. A computer readable medium containing a plurality of data structures for finding a longest prefix match for a variable length search key, comprising:

an input key that is to be searched;

a direct table that stores a first address location for a search tree;

a plurality of pattern search control blocks that each represent a branch in the search tree;

at least one bird representing a partial match of the input key; and a plurality of leaves wherein each leaf is an address location for the result of a search.

15. The computer readable medium containing a plurality of data structures for finding the longest prefix match of claim 14 further comprising a lookup definition table that manages a tree search memory.

16. The computer readable medium containing a plurality of data structures for finding the longest prefix match of claim 15 wherein the lookup definition table comprises entries that define a physical memory that the tree resides in, a size of the key and leaf, and a type of search to be performed.

17. The computer readable medium containing a plurality of data structures for finding the longest prefix match of claim 15 wherein the lookup definition table is implemented in a plurality of memories.

18. The computer readable medium containing a plurality of data structures for finding the longest prefix match of claim 14 wherein a format for a direct table entry includes at least one of a search control block; a next pattern address that point to a next pattern search control block; a leaf control block address that points to a leaf or result; a next bit or bits to test; and a direct leaf.

19. The computer readable medium containing a plurality of data structures for finding the longest prefix match of claim 18 wherein the direct leaf is stored directly in a direct table entry and includes a search control block and a pattern to be compared to a search key.

20. The computer readable medium containing a plurality of data structures for finding the longest prefix match of claim 14 wherein a format for a pattern search control block includes at least one of a search control block; a next pattern address that point to a next pattern search control block; a leaf control block address that points to a leaf or result; and a next bit or bits to test.

21. The computer readable medium containing a plurality of data structures for finding the longest prefix match of claim 14 wherein a leaf data structure includes at least one of a leaf chaining pointer; a prefix length; a pattern to be compared to the search key; and variable user data.

22. The computer readable medium containing a plurality of data structures for finding the longest prefix match of claim 14 wherein a pattern search control block is inserted in the search tree at a position where the leaf patterns differ.

23. The computer readable medium containing a plurality of data structures for finding the longest prefix match of claim 14 wherein a pattern search control block has a shape defined by a width of one and a height of one and is stored in a memory that has a line length of at least 64 bits.

24. The computer readable medium containing a plurality of data structures for finding the longest prefix match of claim 14 wherein a pattern search control block has a shape defined by a width of one and a height of two and is stored in a memory of at least 36 bits.

25. A computer readable medium containing a program product for determining a longest prefix match for a variable length search key, comprising:
program instructions that read an input key as a search string;
program instructions that use the N most significant bits of the input key as an address to index into a table representing a plurality of root nodes of search trees wherein each non-empty entry contains a pointer to a next branch in the search tree or a leaf;
program instructions that determine if the pointer in a non-empty table entry points to a leaf or a next branch of the corresponding search tree;
program instructions that read the next branch contents if the pointer does not point to the leaf of the corresponding search tree and compare the prefix represented by the next branch with the input key to find a distinguishing bit position;
program instructions that read a leaf pattern when the leaf of a corresponding search tree is reached and compare the leaf pattern with the input key to determine if the leaf pattern matches the input key; and
program instructions that return the longest prefix match found for the input key to the requesting application.

26. The computer program product for determining the longest prefix match of claim 25 wherein the table representing a plurality of root nodes of search trees contains $2^N$ entries.

27. The computer program product for determining the longest prefix match of claim 25 wherein the contents of the next branch of the corresponding search tree points to another next branch.

28. The computer program product for determining the longest prefix match of claim 25 wherein the contents of the next branch points to the leaf of the corresponding search tree.

29. The computer program product for determining the longest prefix match of claim 25 wherein the contents of the next branch points to both a bird and to another next branch of the corresponding search tree.

30. The computer program product for determining the longest prefix match of claim 29 wherein the bird represents a special type of leaf that is in the middle of a search tree branch.

31. The computer program product for determining the longest prefix match of claim 30 wherein the bird is placed on a bird stack along with an associated bit position.

32. The computer program product for determining the longest prefix match of claim 31 further comprising program instructions that test the bird stack to determine if it is full.

33. The computer program product for determining the longest prefix match of claim 32 further comprising program instructions that read the contents of the next branch of the corresponding search tree if the bird stack is not full.

34. The computer program product for determining the longest prefix match of claim 32 further comprising program instructions that flush the bird stack if the bird stack is full.

35. The computer program product for determining the longest prefix match of claim 34 wherein the act of program instructions that flush the bird stack comprises:
program instructions that read the contents of the birds from a memory location;
program instructions that compare the hashed key with the pattern stored in the contents of the bird memory location;
program instructions that determine a distinguishing position which represents a first bit at which the bird pattern and the hashed key differ;
program instructions that select the bird with the largest bit number that does not exceed the distinguishing position to keep in the bird stack; and
program instructions that remove all other birds in the bird stack.

36. The computer program product for determining the longest prefix match of claim 25 further comprising program instructions that terminate the search for the longest prefix match when the bit number of the next branch exceeds the length of the hashed key.

37. A method for determining a longest prefix match for a variable length search key by a computer processing device, comprising:
reading an input key as a search string;
using N bits of the input key as an address to access a table representing a plurality of root nodes of search trees wherein each non-empty entry contains a pointer;

determining if the pointer in a non-empty table entry points to at least a leaf of the corresponding search tree;

reading a leaf pattern in the leaf;

comparing the leaf pattern with the input key, to determine if the leaf pattern matches the input key, only if the leaf is an end leaf; and returning the leaf pattern as the longest prefix match found for the input key to a requesting application only if there is an exact match between the leaf pattern and the input key.

38. The method of claim 37 further including:

storing the leaf pattern in a stack if the leaf is not the end leaf of the corresponding tree;

determining other leaves, if any, that are not end leaves of the corresponding tree; and storing leaf patterns associated with each one of the other leaves in the stack.

39. The method of claim 38 further including retracing a path laid out between the end leaf, other leaves and root node of the corresponding tree to determine the longest prefix match if the leaf pattern in the end leaf does not exactly match the input key.

40. The method of claim 39 wherein the retracing includes correlating the input key with the leaf pattern in the end leaf to determine a distinguishing bit position;

using the distinguishing bit position to access the stack; and selecting one of the entries thereon as the longest prefix match found for said input key.

41. A method for determining a longest prefix match for a variable length search key by a computer processing device, comprising (a) reading an input key as a search string;

(b) using the N most significant bits of the input key as an address to index into a table representing a plurality of root nodes of search trees wherein each non-empty entry contains a pointer to a next branch in the search tree or a leaf;

(c) determining if the pointer in a non-empty table entry points to a leaf or a next branch of the corresponding search tree;

(d) reading the next branch contents if the pointer does not point to a leaf of the corresponding search tree;

(e) repeating acts (c) and (d) until a leaf is reached;

reading a leaf pattern when the leaf of a corresponding search tree is reached and comparing the leaf pattern with the input key to determine if the leaf pattern matches the input key; and returning the leaf pattern as the longest prefix match found for the input key to a requesting application.

* * * * *